United States Patent
Santillo et al.

(10) Patent No.: US 9,657,663 B2
(45) Date of Patent: May 23, 2017

(54) SYSTEMS AND METHODS FOR AN AIR-FUEL RATIO IMBALANCE MONITOR

(71) Applicant: Ford Global Technologies, LLC, Dearborn, MI (US)

(72) Inventors: Mario Anthony Santillo, Canton, MI (US); Michael James Uhrich, West Bloomfield, MI (US); Stephen William Magner, Farmington Hills, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/864,626

(22) Filed: Sep. 24, 2015

(65) Prior Publication Data
US 2017/0089280 A1    Mar. 30, 2017

(51) Int. Cl.
| | |
|---|---|
| *F01N 3/00* | (2006.01) |
| *F02D 41/00* | (2006.01) |
| *F02D 41/24* | (2006.01) |
| *F02D 41/02* | (2006.01) |
| *F01N 3/10* | (2006.01) |
| *F01N 13/00* | (2010.01) |

(52) U.S. Cl.
CPC ......... *F02D 41/0085* (2013.01); *F01N 3/101* (2013.01); *F01N 13/008* (2013.01); *F02D 41/0235* (2013.01); *F02D 41/2461* (2013.01)

(58) Field of Classification Search
USPC .............. 60/274, 276, 277, 285; 123/406.16, 123/406.2, 406.21, 406.24, 406.26, 123/406.29, 406.37, 406.38, 672, 673, 123/674; 701/103, 107, 109, 111, 115
See application file for complete search history.

(56) References Cited

U.S. PATENT DOCUMENTS

| | | | |
|---|---|---|---|
| 5,099,647 A | 3/1992 | Hamburg | |
| 6,481,427 B1 * | 11/2002 | Javaherian | F02D 41/1408 123/673 |
| 7,000,379 B2 | 2/2006 | Makki et al. | |
| 7,802,563 B2 * | 9/2010 | Behr | F02D 41/0082 123/692 |
| 8,132,400 B2 | 3/2012 | Storhok et al. | |

(Continued)

OTHER PUBLICATIONS

Santillo, Mario Anthony et al., "Method for Identification of a Threshold-Level Catalyst," U.S. Appl. No. 14/476,538, filed Sep. 3, 2014, 33 pages.

*Primary Examiner* — Binh Q Tran
(74) *Attorney, Agent, or Firm* — Julia Voutyras; McCoy Russell LLP (57) ABSTRACT

Methods and systems are provided for detecting an air-fuel imbalance based on output from multiple degradation monitors. In one example, a method comprises, during feedback engine air-fuel ratio control responsive to output of an exhaust gas sensor positioned downstream of a catalyst, indicating a cylinder imbalance responsive to a catalyst transfer function determined only within a specified frequency range based on the exhaust gas sensor output after determining that the catalyst is nominal, and adjusting an actuator in response to the indicated cylinder imbalance. In this way, air-fuel ratio imbalances may be accurately identified and mitigated, thereby reducing emissions.

19 Claims, 6 Drawing Sheets

(56) References Cited

U.S. PATENT DOCUMENTS

| | | | |
|---|---|---|---|
| 8,510,017 B2 | 8/2013 | Sawada et al. | |
| 8,554,447 B2 * | 10/2013 | Okazaki | F02D 41/1454 |
| | | | 123/672 |
| 8,589,055 B2 * | 11/2013 | Hakariya | F02D 41/0085 |
| | | | 123/481 |
| 8,695,568 B2 | 4/2014 | Yoshikawa | |
| 8,949,001 B2 * | 2/2015 | Suzuki | F02D 41/3005 |
| | | | 123/691 |
| 8,983,754 B2 * | 3/2015 | Watanabe | F02D 41/1456 |
| | | | 123/672 |
| 2010/0211209 A1 * | 8/2010 | Meissen | B21B 37/00 |
| | | | 700/173 |

* cited by examiner

SYSTEMS AND METHODS FOR AN AIR-FUEL RATIO IMBALANCE MONITOR

FIELD

The present description relates generally to methods and systems for controlling a vehicle engine to detect air-fuel ratio imbalances.

BACKGROUND/SUMMARY

A vehicle may include a three-way catalyst (TWC) for treating exhaust gases of an internal combustion engine. Feedback control may be applied to regulate an engine's air-fuel ratio (AFR) so that engine exhaust constituents may be adjusted in a way that improves catalyst efficiency. Some vehicles may include a universal exhaust gas oxygen (UEGO) sensor positioned upstream of the TWC and a heated exhaust gas oxygen (HEGO) sensor positioned downstream of the TWC to control the AFR near stoichiometry. The UEGO sensor provides feedback to adjust engine out gases about stoichiometry. The HEGO sensor provides feedback to bias the engine AFR richer or leaner to improve catalyst efficiency.

An exhaust manifold comprises individual exhaust runners from each engine cylinder that collect into a single tube upstream of the catalyst. To minimize engine-startup emissions, the catalyst is placed as close to the cylinder exhaust ports as possible to quickly heat the catalyst. Meanwhile, the location of the UEGO sensor is optimized to measure the best mix of gases from each cylinder, given the limited available space. Since the exhaust tubing space upstream of the catalyst is limited, a typical issue that arises in naturally-aspirated engines is zone flow. Specifically, zone flow is an imbalanced rich/lean flow through the exhaust system resulting from limited space for exhaust gases to mix in a homogenous manner. If each cylinder AFR is matched with the other cylinders, this zone flow phenomenon is not an issue and stoichiometric AFR can be maintained. However, if there are AFR imbalances from cylinder to cylinder resulting from, say, part-to-part variability or intentionally-induced on-board diagnostics (OBD) imbalances, the exhaust stream will comprise differing levels of AFR depending on the location in the exhaust runner. If the UEGO sensor cannot measure a proper mix of each cylinder's gases due to this zone flow phenomenon, the rich/lean gases will quickly overwhelm the catalyst and exit the tailpipe as increased CO and NOx emissions.

Other attempts to address AFR imbalance include monitoring engine AFR using one or more HEGO and/or UEGO sensors. One example approach is shown by Behr et al. in U.S. Pat. No. 7,802,563. Therein, a method for monitoring AFR of an engine comprises routing exhaust gas from a group of cylinders to an oxygen sensor, sampling the oxygen sensor above a firing frequency of the group of cylinders, determining a difference between the samples over a window interval, and indicating an AFR imbalance in the group of cylinders when a ratio of at least the window interval over a total number of window intervals exceeds a threshold.

However, the inventors herein have recognized potential issues with such systems and methods. As one example, the system discussed above relies upon an individual exhaust gas sensor for each group of cylinders, some of which may be dedicated to AFR imbalance monitoring. As another example, if one or more of the exhaust gas oxygen sensors is degraded, the method may erroneously indicate an AFR imbalance due to biased functioning of the sensor. Further, if one or more of the exhaust gas oxygen sensors used to monitor engine AFR is downstream of a catalyst, the method may erroneously indicate an AFR imbalance due to degradation of the catalyst.

In one example, the issues described above may be addressed by a method comprising, during feedback engine air-fuel ratio control responsive to output of an exhaust gas sensor positioned downstream of a catalyst, indicating a cylinder imbalance responsive to a catalyst transfer function determined only within a specified frequency range based on the exhaust gas sensor output, and adjusting an actuator in response to the indicated cylinder imbalance. The method further comprises determining that the catalyst is nominal prior to indicating the cylinder imbalance. In this way, an air-fuel ratio imbalance may be accurately identified and mitigated, thereby reducing emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
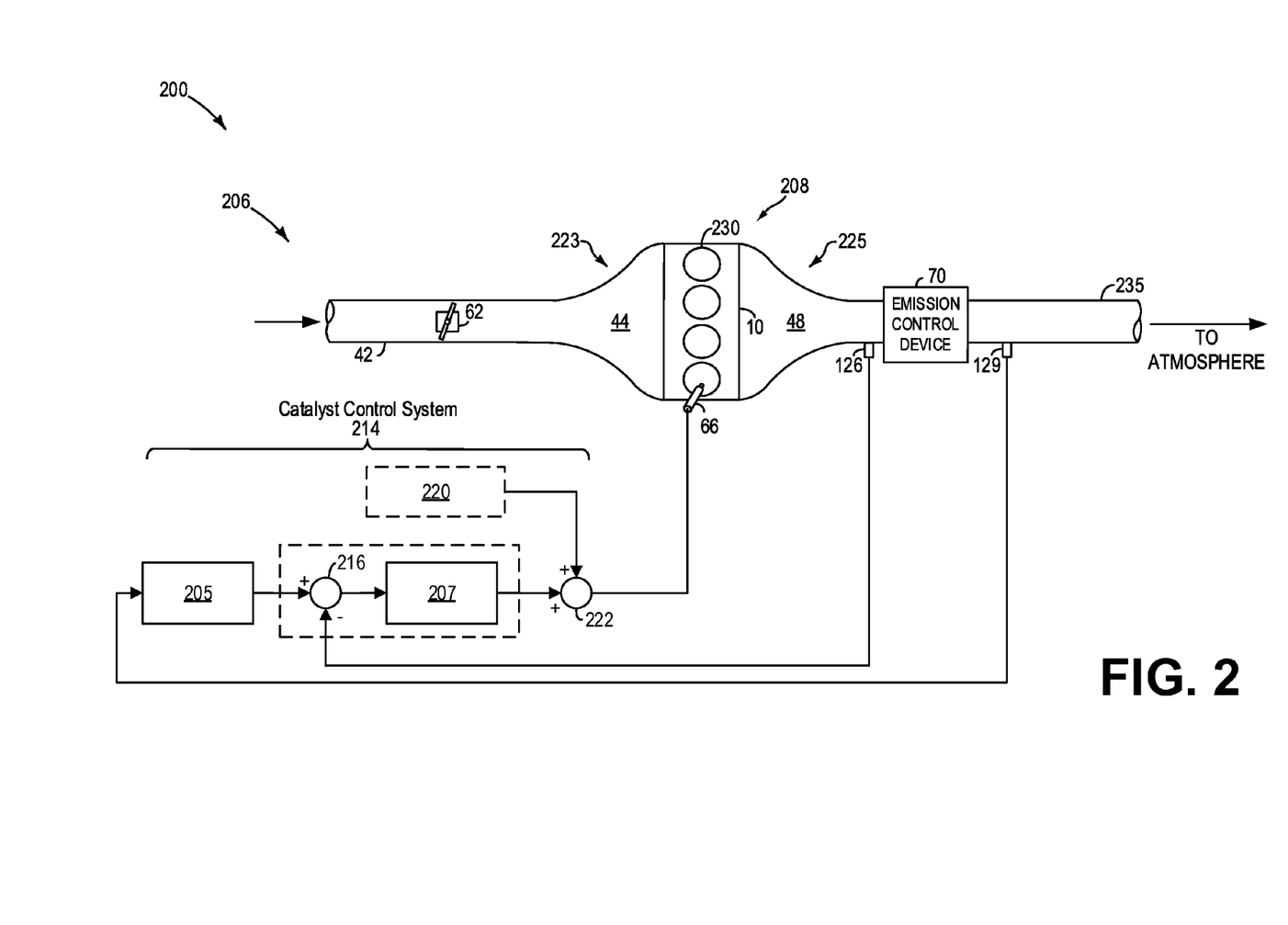
FIG. 2 shows a schematic illustration of an example catalyst control system.
Figure 3:
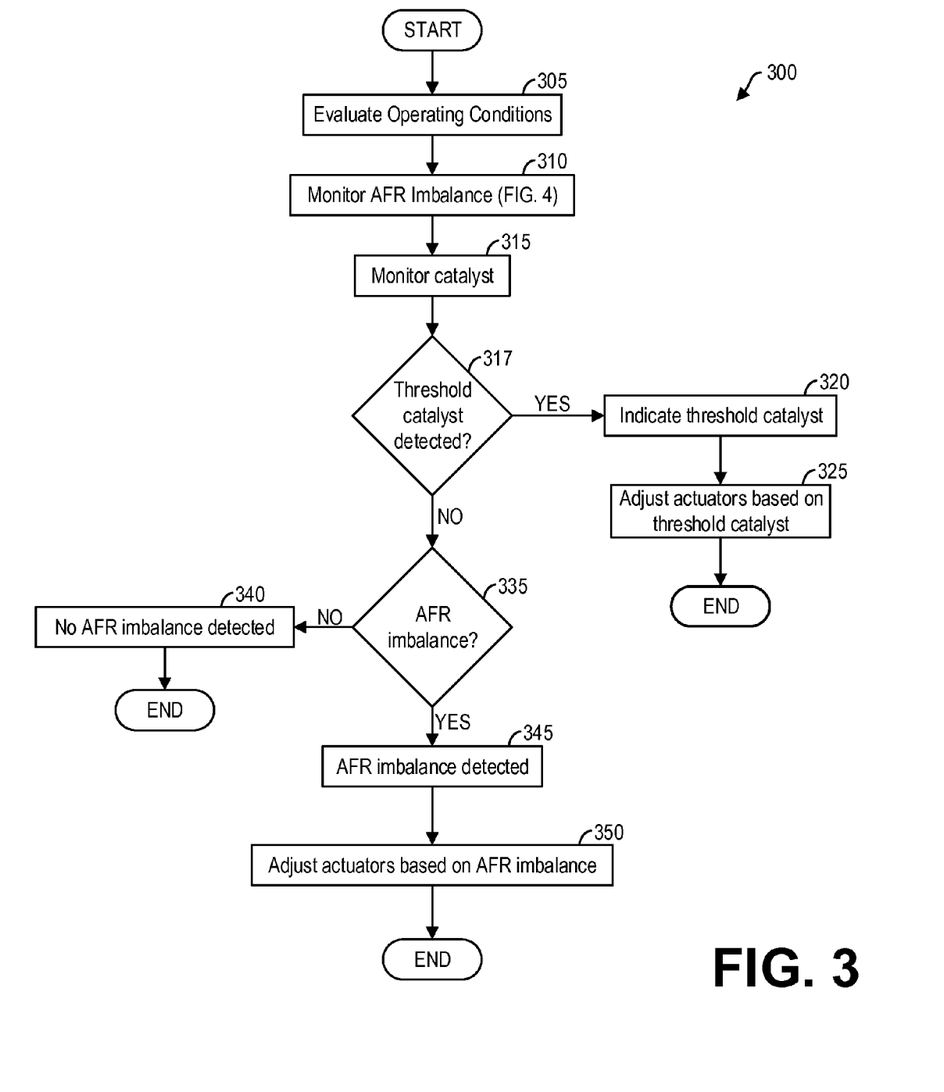
FIG. 3 shows a high-level flow chart illustrating an example method for identifying an air-fuel ratio imbalance.
Figure 4:
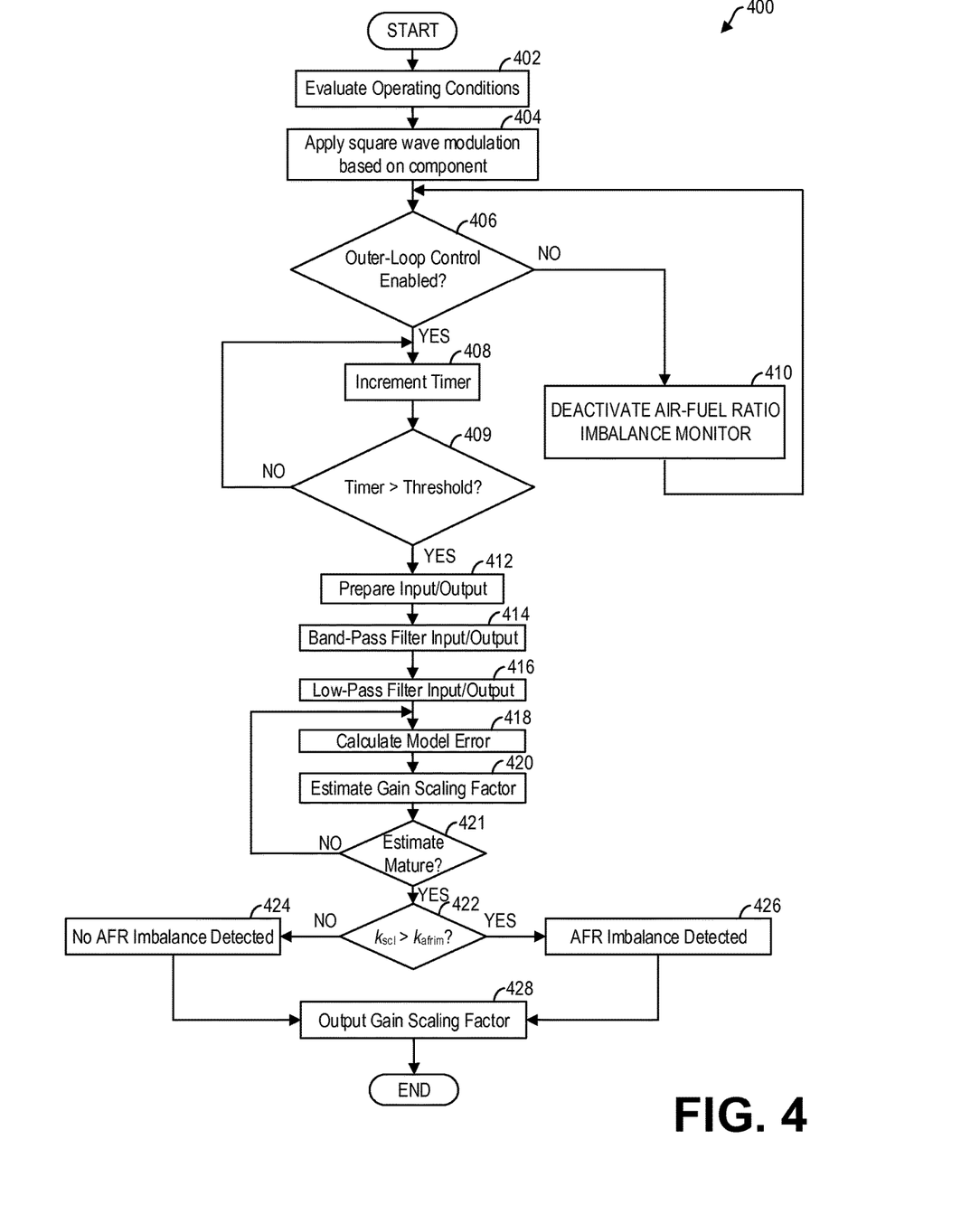
FIG. 4 shows a high-level flow chart illustrating an example method for identifying an air-fuel ratio imbalance based on a catalyst transfer-function gain magnitude.
Figure 6:
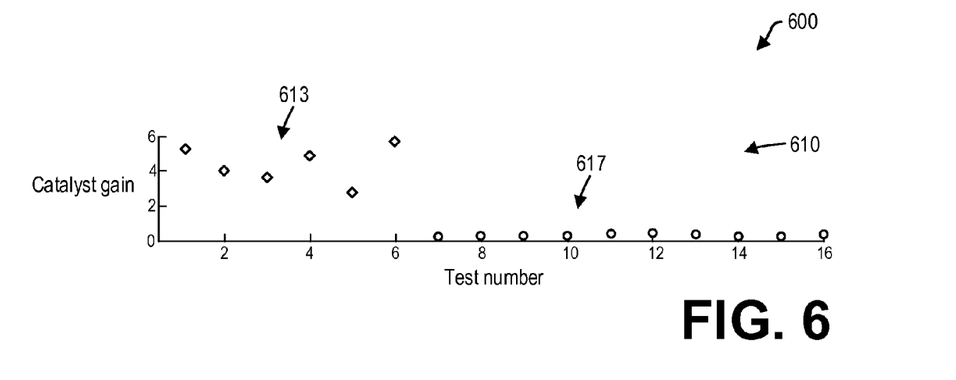
FIGS. 6 and 7 show a set of graphs illustrating an example method for identifying an AFR imbalance.
Figure 7:
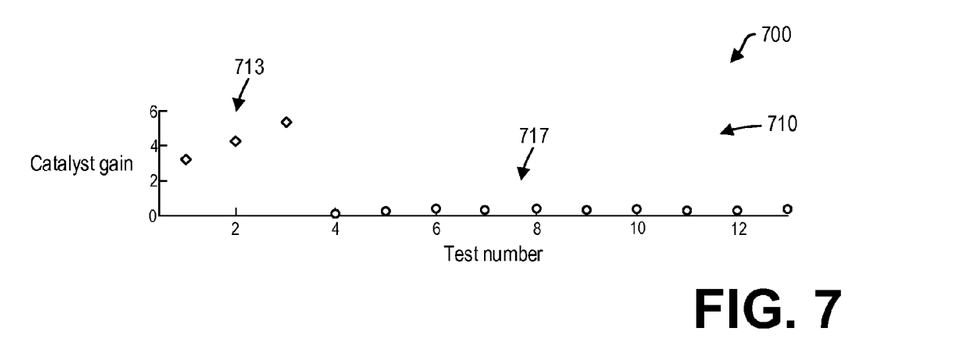

The following description relates to systems and methods for identifying and mitigating an air-fuel imbalance. Specifically, methods and systems for detecting an air-fuel imbalance based on output from multiple monitors are described. The systems and methods may be implemented in a vehicle, such as the vehicle system depicted in FIG. 1. As depicted in FIG. 2, the vehicle may include a multi-cylinder engine system and an exhaust after-treatment system, as well as multiple feedback control loops for monitoring and controlling AFR. If one of the multiple cylinders has an air-fuel imbalance with respect to the other cylinders, the exhaust flow may be non-uniform and the rich/lean exhaust gases will quickly overwhelm the catalyst and exit the tailpipe as increased CO and NOx emissions. Further, degradation of the catalyst and/or the exhaust gas oxygen sensors may trigger false detections of an AFR imbalance. A method for detecting an AFR imbalance, such as the method depicted in FIG. 3, includes fusing the output of an AFR imbalance monitor and a threshold catalyst monitor to increase the validity of AFR imbalance detection. Specifically, the method first rules out the possibility of a threshold or degraded catalyst prior to determining if an AFR imbalance exists, because a method for detecting an AFR imbalance by calculating a catalyst transfer function gain magnitude, such as the method depicted in FIG. 4, may be based on the nominal operability of the catalyst. Although the methods of FIGS. 3 and 4 are described with regard to AFR imbalances and threshold catalysts, a method for detecting degraded conditions in general, such as the method depicted in FIG. 5, may include evaluating the output of multiple degradation monitors to identify a single degraded component. In this way, the interdependence of system components may be taken into consideration prior to indicating a degraded component, thereby increasing the accuracy of degradation monitors and in turn, reducing emissions. FIGS. 6 and 7 illustrate example data demonstrating the ability to detect an AFR or cylinder imbalance based on a catalyst transfer function gain magnitude.

Figure 1:
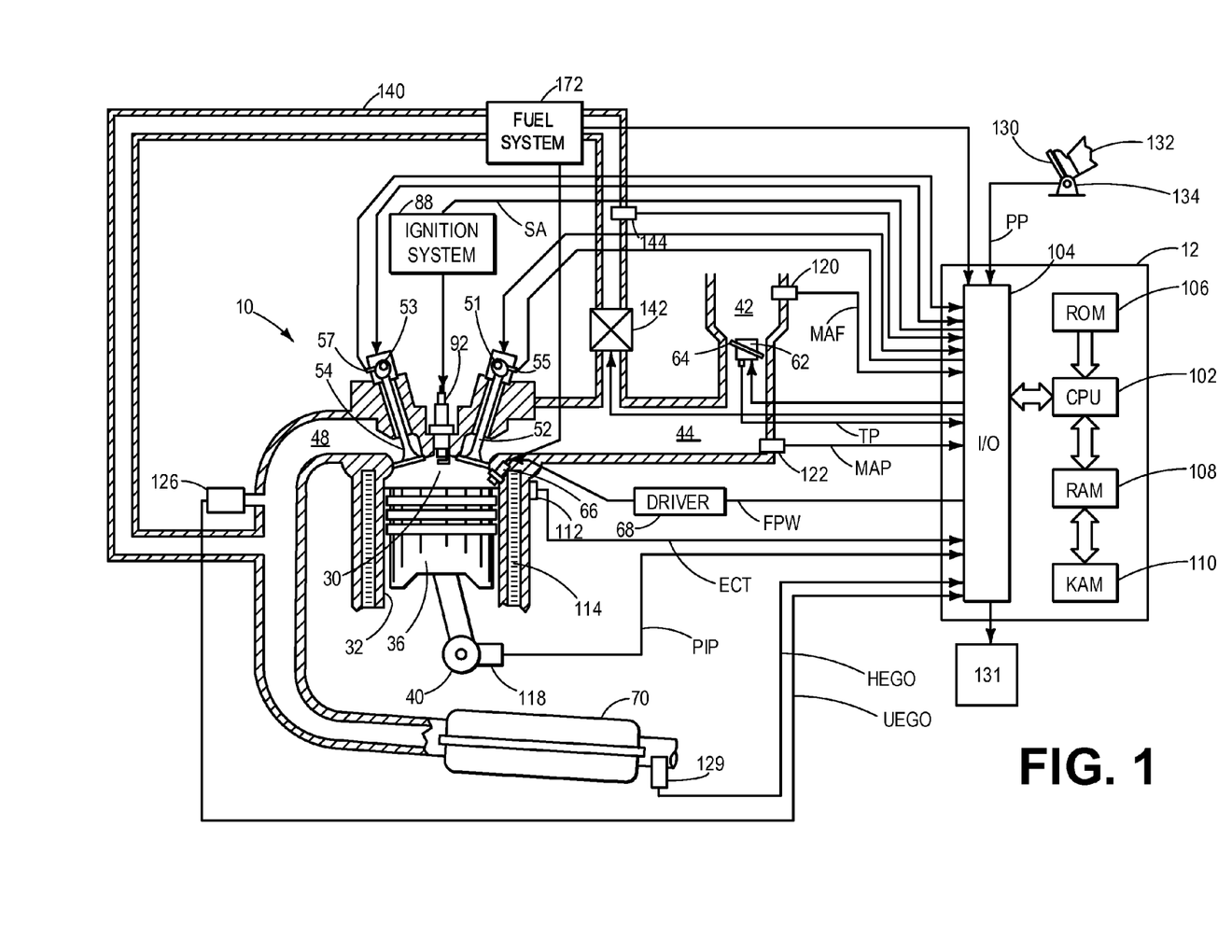
FIG. 1 shows a schematic depiction of an example engine system.

FIG. 1 illustrates a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 is an accelerator pedal and it includes a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may engage crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative examples, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some examples, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion chamber 30.

It will be appreciated that in an alternate example, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some examples, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one example, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC), configured to reduce NOx and oxidize CO and unburnt hydrocarbons. In some examples, device 70 may be a NOx trap, various other emission control devices, or combinations thereof.

A second, downstream exhaust gas sensor 129 is shown coupled to exhaust passage 48 downstream of emissions control device 70. Downstream sensor 129 may be any suitable sensor for providing an indication of exhaust gas air-fuel ratio such as a UEGO, EGO, HEGO, etc. In one example, downstream sensor 129 is a HEGO configured to indicate the relative enrichment or leanness of the exhaust gas after passing through the catalyst. As such, the HEGO may provide output in the form of a switch point, or the voltage signal at the point at which the exhaust gas switches from lean to rich.

Further, in the disclosed examples, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer-readable data representing non-transitory instructions executable by processor 102 for performing the methods described below as well as other variants that are anticipated but not specifically listed.

In some examples, controller 12 may output an indication of system degradation to a light or display panel 131. The indication may be a visual alert such as an illuminated light or a message. The message may include a diagnostic code that indicates the nature of the degraded condition. For example, controller 12 may indicate a degraded catalyst via light or display panel 131. The indication may be an alphanumeric code representing catalyst or other component degradation.

As described above, FIG. 1 only shows one cylinder of a multi-cylinder engine, and each cylinder may similarly include its own set of intake/exhaust valves, fuel injector, spark plug, etc.

FIG. 2 shows a schematic illustration of inner and outer feedback control loops for a catalyst control architecture 200. Catalyst control architecture 200 includes an engine system 206 and a catalyst control system 214, where the engine 10 includes an exhaust system 225.

The engine system 208 may include an engine 10 having a plurality of cylinder 230. The engine 10 includes an engine intake 42 and an engine exhaust 48. The engine intake 42 includes a throttle 62 in fluidic communication with engine intake manifold 44. The engine exhaust system 225 includes an exhaust manifold 48 leading to an exhaust passage 235 that routes exhaust gas to the atmosphere. The engine exhaust system 225 may include one or more emission control devices 70, which may be mounted in a close-coupled position in the exhaust. One or more emission control devices may include a three-way catalyst, lean NOx trap, particulate filter, oxidation catalyst, etc. It will be appreciated that other components may be included in the engine such as a variety of valves and sensors, as depicted, for example, in FIG. 1.

The vehicle system 206 may further include a catalyst control system 214. Catalyst control system 214 is shown receiving information from exhaust gas oxygen sensors 126 and 129 and sending control signals to fuel injectors 66. As one example, exhaust gas oxygen sensors may include exhaust gas sensor 126 located upstream of the emission control device 70, and exhaust gas sensor 129 located downstream of the emission control device 70. Other sensors such as pressure, temperature, air-fuel ratio, and composition sensors may be coupled to various locations in the vehicle system 206. The catalyst control system 214 may receive input data from the various sensors, process the input data, and apply the actuators in response to the processed input data based on instructions or code programmed therein corresponding to one or more routines. Catalyst control system 214 may be configured with instructions stored in non-transitory memory that cause catalyst control system 214 to perform control routines via one or more actuators based on information received via one or more sensors. Example control routines are described herein with reference to FIG. 3.

In one example, emission control device 70 is a three-way catalyst, exhaust gas sensor 126 is a UEGO sensor, and exhaust gas sensor 129 is a HEGO sensor.

Catalyst control system 214 regulates the AFR to a desired AFR near stoichiometry and fine-tunes this regulation based on the deviation of a HEGO voltage from a pre-determined HEGO-voltage set point Inner-loop controller 207 uses the upstream UEGO sensor 126 for higher-bandwidth feedback control while outer-loop controller 205 uses the HEGO sensor 129 for lower-bandwidth control. Catalyst control system 214 may be implemented by an engine controller, such as controller 12.

Inner-loop controller 207 may comprise a proportional-integral-derivative (PID) controller that regulates the engine AFR by generating an appropriate fuel command (e.g., fuel pulse width). Summing junction 222 combines the fuel command from inner-loop controller 207 with commands from feed-forward controller 220. This combined set of commands is delivered to the fuel injectors 66 of engine 10. UEGO sensor 126 provides a feedback signal to the inner-loop controller 207, the UEGO feedback signal proportional to the oxygen content of the feedgas or engine exhaust between the engine 10 and TWC 70. Outer-loop controller 205 generates a UEGO reference signal (e.g., a desired air-fuel ratio) provided to the inner-loop controller 207. The UEGO reference signal is combined with the UEGO feedback signal at junction 216. The error or difference signal provided by junction 216 is then used by inner-loop controller 207 to adjust the fuel command so that the actual AFR within engine 10 approaches the desired AFR. HEGO sensor 129 provides feedback to the outer loop controller 205. The HEGO feedback signal may be used to adjust the UEGO reference signal, or air-fuel ratio reference signal, provided to inner-loop controller 207 via junction 216. Additionally, outer-loop controller 205 works to improve catalyst efficiency by imposing a low amplitude air-fuel ratio square wave at the catalyst input. The square wave allows exhaust gas constituents entering the catalyst to vary so as to replenish oxygen and CO in the catalyst, thereby improving hydrocarbon oxidation and NOx reduction.

Thus, the system of FIGS. 1 and 2 provide for a system, comprising: an engine including multiple cylinders and an exhaust system, the exhaust system including a catalyst and oxygen sensors positioned upstream and downstream of the catalyst; and a controller including instructions stored in non-transitory memory that when executed cause the controller to: calculate a gain of a catalyst transfer function based on data output by the oxygen sensors; responsive to detecting a nominal catalyst, indicating a cylinder imbalance responsive to the gain above a threshold; and adjust an actuator in response to the cylinder imbalance. Example methods implemented in such a system are described further herein with regard to FIGS. 3-5.

FIG. 3 is a high-level flow chart illustrating an example method 300 for identifying an AFR imbalance in accordance with the current disclosure. In particular, method 300 relates to determining an AFR imbalance based on the magnitude of a catalyst's frequency-domain transfer function in a specific range of frequencies corresponding to a commanded square-wave input. Method 300 will be described herein with reference to the components and systems depicted in FIGS. 1 and 2, though it should be understood that the method may be applied to other systems without departing from the scope of this disclosure. Method 300 may be carried out by controller 12, and may be stored as executable instructions in non-transitory memory.

Method 300 begins at 305. At 305, method 300 includes evaluating operating conditions. Operating conditions may include, but are not limited to, engine temperature, ambient temperature, engine speed, engine load, time since engine stop, engine AFR, and HEGO sensor voltage. Method 300 proceeds to 310 after engine operating conditions are determined.

At 310, method 300 includes monitoring the catalyst gain to detect an AFR imbalance. Specifically, monitoring the catalyst gain may comprise determining the magnitude of the catalyst's frequency-domain transfer function in a specific range of frequencies corresponding to a commanded square-wave input, and comparing the magnitude to a threshold. As described further herein with regard to FIG. 4, the method determines the magnitude by using a simplified TWC model comprising a system gain k, a time delay $\tau_d$, and an integrator, for example as expressed in the equation:

$$y = k \frac{\exp(-\tau_d s)}{s} u$$

or equivalently, $$\dot{y}(t) = k u(t - \tau_d)$$

where y is the catalyst output AFR, u is the catalyst input AFR, s is the frequency-domain Laplace operator, and $\dot{y}$ is the time-domain derivative operator. In the case of an AFR imbalance on a zone-flow exhaust system, or in the case of a threshold catalyst, the significant exhaust gas deviations away from stoichiometry are represented by the downstream oxygen sensor as an increased system gain. Thus the system gain k may be separated into a calibrated nominal system gain $k_0$ and a scaling gain $k_{scl}$ to represent deviations due to degradation, for example, $k = k_0 \times k_{scl}$. Determining the magnitude of the catalyst transfer function may thus comprise determining the scaling gain $k_{scl}$ (also referred to herein as the catalyst gain or the catalyst gain magnitude estimate). The method may continuously monitor the catalyst gain to detect an AFR imbalance while an outer loop AFR control loop is enabled.

Continuing at 315, method 300 includes monitoring the catalyst to detect a threshold catalyst. Since the method for estimating the magnitude of the catalyst transfer function described above is sensitive to an AFR imbalance, monitoring the catalyst to detect a threshold catalyst is preferably not based on the catalyst gain. Instead, method 300 may monitor the catalyst during conditions when fuel injection and combustion does not occur so that the catalyst monitor is not adversely affected by a potential AFR imbalance. As an illustrative and non-limiting example, method 300 may monitor the catalyst during deceleration fuel shut-off (DFSO) conditions by calculating an amount of oxygen stored in the catalyst. For example, as described by Sealy et al. in U.S. Pat. No. 8,756,915, a method for monitoring a catalyst comprises, following a DFSO duration, indicating degradation of the catalyst based on an amount of rich products required to cause a sensor to become richer than a threshold, wherein the amount of rich products required may be correlated to an amount of oxygen stored in the catalyst.

Continuing at 317, method 300 includes determining if a threshold catalyst is detected based on the catalyst monitor output at 315. As discussed above and further herein, the presence of a threshold catalyst may cause the scaling gain $k_{scl}$ to increase (e.g., above the nominal value of 1), and so a threshold catalyst may be considered a noise factor when determining whether an AFR imbalance exists. Therefore, if a threshold catalyst is detected, the method does not indicate an AFR imbalance regardless of the scaling gain.

If a threshold catalyst is detected ("YES"), method 300 proceeds to 320. At 320, method 300 includes indicating a threshold catalyst. At 325, method 300 includes adjusting actuators based on the threshold catalyst. Specifically, method 300 adjusts actuators to attempt to reduce engine emissions in response to the catalyst transfer function gain magnitude. In one example, the engine fuel injectors are adjusted so as to reduce the amplitude of the square wave AFR provided to the catalyst being diagnosed for possible degradation. Method 300 then ends.

Thus the method does not attempt to detect an AFR imbalance if the catalyst is degraded. However, returning to 317, if a threshold catalyst is not detected ("NO"), method 300 proceeds to 335. At 335, method 300 includes determining if there is an AFR imbalance. An AFR imbalance may be determined by comparing the catalyst transfer function gain magnitude to an imbalance threshold: if the gain magnitude estimate is above the imbalance threshold, then an AFR imbalance is detected; otherwise, no AFR imbalance is detected.

As an example, the imbalance threshold may be predetermined using tests over a variety of drive cycles with a full-useful life (FUL) catalyst system wherein a variety of AFR imbalances are intentionally induced. Beyond simple detection of an imbalance, in some examples, determining if there is an AFR imbalance further includes determining a type and an amount of AFR imbalance. For example, the method may reference a look-up table to determine an amount (e.g., 10%, 15%, 20%, and so on) and a type (e.g., lean or rich). Further still, in some examples the method may determine, based at least in part on the gain magnitude estimate, a particular cylinder and/or cylinder bank responsible for the imbalance. In this way, as discussed further herein, the method may adjust actuators (e.g., fuel injectors) to mitigate the imbalance.

As an illustrative example, FIG. 6 shows a graph 600 illustrating the method described herein for detecting AFR imbalance based on catalyst gain estimates. In particular, the graph 600 includes a plurality of catalyst gain estimates 610 acquired during sixteen individual tests, wherein the individual tests are performed over a variety of drive cycles using a FUL catalyst system both with and without an AFR imbalance. In each case, the non-intrusive method begins with an initial scaling gain estimate of 1.0 and continually updates when the outer-loop controller is enabled. The catalyst gain estimates 613 correspond to the first six tests wherein an AFR imbalance of either 20% rich or 20% lean AFR are induced on individual cylinders. The catalyst gain estimates 617 correspond to tests wherein AFR imbalances are not induced. As shown, the method correctly identifies the presence of an AFR imbalance based on the catalyst gain estimate, regardless of whether the imbalance is rich or lean.

As another illustrative example, FIG. 7 shows a graph 700 illustrating the method described herein for detecting AFR imbalance based on catalyst gain estimates. In particular, the graph 700 includes a plurality of catalyst gain estimates 710 acquired during thirteen individual tests, wherein the individual tests are performed over a variety of drive cycles using a FUL catalyst system both with and without an AFR imbalance. In each case, the non-intrusive method begins with an initial scaling gain estimate of 1.0 and continually updates when the outer-loop controller is enabled. To demonstrate the method's ability to determine varying levels of AFR imbalance, different imbalance levels are induced during the first three tests, while no imbalances are induced in the ten succeeding tests. Specifically, the catalyst gain estimates 713 of test numbers one through three respectively correspond to induced imbalance levels of 10%, 15%, and 20% rich on a single cylinder. Meanwhile, the catalyst gain estimates 717 of test numbers four through thirteen correspond to tests wherein no imbalance is induced. As shown, the catalyst gain estimate is shown to increase nearly linearly with increasing AFR imbalance levels while maintaining a statistically significant separation away from the balanced tests. Therefore, the AFR imbalance monitor described herein enables the reduction of AFR imbalance detection thresholds while simultaneously increasing emission output capability.

Referring again to 335 of FIG. 3, if there is not an AFR imbalance ("NO"), method 300 proceeds to 340, wherein no AFR imbalance is detected. Method 300 may provide no indication of an AFR imbalance if no AFR imbalance is detected. Method 300 then ends. In some examples, the method may continuously loop (e.g., return to 305), at least when the outer control loop is activated. In other examples, the method may increment a timer to track an amount of time since the last AFR imbalance determination, and the AFR imbalance determination may be performed periodically to conserve processing resources.

However, referring again to 335, if an AFR imbalance is detected ("YES"), method 300 proceeds to 345. At 345, an AFR imbalance is detected. Method 300 may provide an indication of an AFR imbalance if an AFR imbalance is detected. In one example, method 300 provides an indication of AFR imbalance via changing an operating state of a light or display panel.

Continuing at 350, method 300 includes adjusting actuators based on the AFR imbalance. Specifically, method 300 adjusts actuators to attempt to reduce engine emissions in response to the catalyst transfer function gain magnitude. In some examples, the method adjusts actuators (e.g., engine fuel injectors) to further determine an amount and/or type of AFR imbalance, detect which cylinder and/or cylinder banks include the AFR imbalance, and so on. Based on these determinations, the method may further adjust the actuators to account for the AFR imbalance. Method 300 then ends.

It should be appreciated that while FIG. 3 depicts monitoring for an AFR imbalance at 310 and monitoring the catalyst at 315 as operating sequentially or in series, in some examples both monitors operate concurrently or in parallel. If at any time a threshold catalyst is detected, the method indicates a threshold catalyst and stops monitoring for AFR imbalance. If the AFR imbalance monitor detects the scaling gain above the AFR imbalance threshold, then the method waits for the catalyst monitor to say YES or NO before indicating the AFR imbalance.

Thus, the method of FIG. 3 provides a method for detecting an AFR imbalance based on a catalyst transfer function gain magnitude estimate. The method accounts for potential sources of noise (e.g., a threshold catalyst) in the gain magnitude estimate before performing an AFR imbalance determination based on the gain magnitude estimate. In this way, the method avoids erroneously detecting an AFR imbalance due to other degraded components. An example method for calculating the catalyst transfer function gain magnitude estimate is described further herein with regard to FIG. 4.

FIG. 4 is a high-level flow chart illustrating an example method 400 for detecting an AFR imbalance in accordance with the current disclosure. In particular, method 400 relates to determining the magnitude of a catalyst's frequency-domain transfer function in a specific range of frequencies corresponding to a commanded square-wave input, and determining if an AFR imbalance is present based on the magnitude. Method 400 will be described herein with reference to the components and systems depicted in FIGS. 1 and 2, though it should be understood that the method may be applied to other systems without departing from the scope of this disclosure. Method 400 may be carried out by controller 12, and may be stored as executable instructions in non-transitory memory.

Method 400 begins at 402. At 402, method 400 includes evaluating engine operating conditions. Operating conditions may include, but are not limited to, engine temperature, ambient temperature, engine speed, engine load, time since engine stop, engine AFR, and HEGO sensor voltage. Method 400 proceeds to 404 after engine operating conditions are determined.

At 404, method 400 applies an air-fuel modulation to the engine air-fuel ratio. The amplitude of the modulation is centered about stoichiometry, or in some examples a small bias may be applied. The air-fuel modulation frequency may be based on the volume and location of the catalyst for which the transfer function is being estimated, or other factors such as engine speed and load. As a non-limiting example, the frequency may be within 1 to 2 Hz. In one example, the frequency may be 1.5 Hz. Method 400 proceeds to 406 after beginning to modulate the engine's AFR. In some example systems, step 404 is already active when outer loop control is enabled.

At 406, method 400 judges if the engine's outer AFR control loop has been activated. In one example, the outer AFR control loop may be activated after the engine's inner AFR control loop is activated and controlling to a desired AFR near stoichiometry, after the rear HEGO sensor reaches a threshold temperature, and in response to a threshold amount of time since engine start. In this way, method 400 may avoid determining the magnitude of the catalyst's transfer function if the vehicle is operating in a fuel cut-out mode, cold start, or other condition where post-catalyst AFR may not be reliable for catalyst transfer function determination. If method 400 judges that the outer AFR control loop is active ("YES"), method 400 proceeds to 408. Otherwise ("NO"), method 400 proceeds to 410.

At 410, method 400 deactivates the AFR imbalance monitor. The AFR imbalance monitor is deactivated since the HEGO output may not be reliable under the present operating conditions. Method 400 returns to 406 after the AFR imbalance monitor is deactivated and will not attempt to run until the next program loop.

At 408, method 400 activates and increments a timer. The timer allows the system to avoid determining the catalyst transfer function magnitude during mode transients after the outer AFR control loop is activated. Method 400 proceeds to 409 after the timer is incremented.

At 409, method 400 judges if a value of the timer is greater than a threshold value. If so ("YES"), method 400 proceeds to 412. Otherwise ("NO"), method 400 returns to 408 where the timer is incremented.

At 412, method 400 prepares the monitored catalyst's input and output for processing. In particular, the output voltage of the upstream UEGO is converted into an air-fuel ratio. Likewise, the HEGO sensor output is converted into an air-fuel ratio. The voltage output from the sensors is representative of an oxygen concentration in the exhausts. The voltages are converted into AFRs via passing the voltages through transfer functions having AFR as output.

Additionally, the tailpipe AFR as estimated from the HEGO sensor output is operated on by a high-pass filter with an adjustable time constant $t_c$ (e.g., a typical safeguard against signal noise introduced near the sampling frequency) to estimate the derivative of the output as shown in the following equation:

$$\dot{y}_f = \frac{s}{t_c s + 1} y$$

where $\dot{y}_f$ is the estimated derivative of the catalyst output gas air-fuel ratio y, s is the Laplace operator, and $t_c$ is an adjustable time constant. The catalyst AFR input determined from the UEGO is converted into a modeled output of the subject catalyst. In particular, the UEGO-determined AFR, the input u, is operated on by a system delay $\tau_d$, a low-pass filter with time constant $t_c$, and a system gain $k_0$ to provide the modeled derivative of the catalyst output gas AFR as described in the following equation:

$$\dot{y}_{m,f} = \frac{k_0}{t_c s + 1} u(t - \tau_d)$$

where $\dot{y}_{m,f}$ is the modeled estimated derivative of the catalyst output AFR y, s is the Laplace operator, $t_c$ is an adjustable time constant, u is the catalyst input AFR, and $\tau_d$ is a time delay. The system gain $k_0$ and the time delay $\tau_d$ are representative of a nominal catalyst system and are typically functions of engine variables such as mass flow through the engine system. Method 400 proceeds to 414 after the sensor outputs are converted into AFRs and filtered as described above.

At 414, method 400 applies a band-pass filter to the derivative of the measured downstream or post-catalyst AFR $\dot{y}_f$ and the derivative of the modeled downstream AFR $\dot{y}_{m,f}$. The filtering may be expressed by the following equation:

$$\{\dot{y}_{bp}, \dot{y}_{m,bp}\} = G_{bp}(s)\{\dot{y}_f, \dot{y}_{m,f}, t_{cl}, t_{ch}\}$$

where $G_{bp}$ designates the transfer function of the band-pass filter, $\dot{y}_{bp}$ is the band-pass filtered version of $\dot{y}_f$, $\dot{y}_{m,bp}$ is the band-pass filtered version of $\dot{y}_{m,f}$, and $t_{cl}$ and $t_{ch}$ are low and high cutoff frequencies of the band-pass filter. Method 400 proceeds to 416 after the signals have been band-pass filtered.

At 416, method 400 applies a low-pass or moving average filter to $\dot{y}_{bp}$ and $\dot{y}_{m,bp}$. The low-pass filtering may be expressed by the following equation:

$$\{\dot{y}_{lp}, \dot{y}_{m,lp}\} = G_{lp}(s)\{|\dot{y}_{bp}|, |\dot{y}_{m,bp}|\}$$

where $G_{lp}$ designates the transfer function of the low-pass filter, $\dot{y}_{lp}$ is the low-pass filtered version of $\dot{y}_{bp}$, and $\dot{y}_{m,lp}$ is the low-pass filtered version of $\dot{y}_{m,bp}$. The low-pass filter is applied so that the input/output phasing does not affect the estimation result of the catalyst's transfer function gain. Method 400 proceeds to 418 after the signals have been low-pass filtered.

At 418, method 400 determines a model error E. The model error is determined according to the following equation:

$$\epsilon = \dot{y}_{lp} - k_{scl} \times \dot{y}_{m,lp}$$

where $\epsilon$ is the model error and $k_{scl}$ is the catalyst transfer function gain magnitude estimate that is given a starting value (e.g., 1), which the algorithm adjusts as the method iterates after each program loop. Method 400 proceeds to 420 after the catalyst transfer function gain magnitude estimate is determined.

At 420, method 400 determines an updated catalyst transfer function gain magnitude estimate. In particular, method 400 applies an integrator and a calibrated (e.g., adjustable) gain γ to update the catalyst transfer function gain magnitude as indicated in the following equation:

$$\dot{k}_{scl} = \gamma \cdot \epsilon.$$

Method 400 proceeds to 421 after the catalyst transfer function gain magnitude is updated.

At 421, method 400 judges if the estimation has met a maturity metric. In one example, the maturity metric is an amount of time (e.g., ten minutes). In other examples, the maturity metric may comprise a distance traveled by the vehicle. More sophisticated methods that evaluate engine variables in terms of persistent change are yet another effective way to evaluate maturity. If method 400 judges that the maturity metric has been met ("YES"), method 400 proceeds to 422. Otherwise ("NO"), method 400 returns to 418.

At 422, method 400 judges if the estimated catalyst transfer function gain magnitude $k_{scl}$ is greater than a threshold magnitude $k_{afrim}$ that indicates an AFR imbalance. If so ("YES"), method 400 proceeds to 426. Otherwise ("NO"), method 400 proceeds to 424.

At 424, method 400 indicates that an AFR imbalance is not detected. Method 400 may provide no indication of an AFR imbalance. Method 400 proceeds to 428.

At 428, method 400 outputs the estimated catalyst transfer function gain magnitude or gain scaling factor $k_{scl}$ calculated at 420 so that a parent process, such as method 300 described herein above, may finally determine if an AFR imbalance is present (e.g., after determining whether a threshold catalyst is causing the increased gain scaling factor). Additionally, if it is determined that an AFR imbalance is detected, method 400 may adjust actuators to attempt to reduce engine emissions in response to the catalyst transfer function gain magnitude above the imbalance threshold and a separate catalyst monitor detecting a nominal catalyst, for example as described herein above with regard to FIG. 3. In one example, the engine fuel injectors are adjusted so as to reduce the amplitude of the square wave AFR provided to the catalyst. A higher amplitude square wave may be desirable when the catalyst is operating as desired since it may require additional gases to penetrate and refresh catalyst reaction sites near the downstream side of the catalyst because the front reaction sites are operating efficiently. However, if the catalyst is degraded, a square wave of the same amplitude may result in lean or rich breakthrough. Therefore, the square wave amplitude may be reduced via adjusting fuel injector on time. Method 400 proceeds to exit after the gain scaling factor is output.

At 426, method 400 indicates that an AFR imbalance is detected. In one example, method 400 provides an indication of an AFR imbalance via changing an operating state of a light or display panel. Method 400 proceeds to 428 after detecting the AFR imbalance.

Thus, the methods of FIGS. 3 and 4 provide for a method for an AFR imbalance monitor. The method includes determining a catalyst transfer function gain magnitude estimate, and comparing the gain magnitude estimate to an AFR imbalance threshold responsive to a nominal catalyst. In particular, the method comprises perturbing a catalyst via supplying the catalyst exhaust gases resulting from a varying air-fuel ratio, routing data from an upstream oxygen sensor through a model to provide a model output derivative estimate and data from a downstream oxygen sensor through a high-pass filter to provide a tailpipe air-fuel ratio derivative estimate, band-pass filtering the model output to provide a band-passed model output derivative estimate and band-pass filtering the tailpipe air-fuel ratio derivative estimate to provide a band-passed tailpipe air-fuel ratio derivative estimate, estimating a catalyst transfer function gain magnitude from a difference between the band-passed tailpipe air-fuel ratio derivative estimate and the band-passed model output derivative estimate, and indicating an air-fuel ratio imbalance responsive to the catalyst transfer function gain magnitude above a threshold. In a first example of the method, the method further comprises low-pass filtering the band-passed model output derivative estimate and the band-passed tailpipe air-fuel ratio derivative estimate before estimating the catalyst transfer function gain magnitude. In a second example of the method optionally include the first example, the method further comprises determining an error between the low-pass filtered band-passed model output derivative estimate and the low-pass filtered band-passed tailpipe air-fuel ratio derivative estimate. In a third example of the method optionally include one or more of the first and second examples, the method further comprises not indicating the air-fuel ratio imbalance responsive to the catalyst transfer function gain magnitude indicating a threshold catalyst. In a fourth example of the method optionally include one or more of the first through third examples, the method further comprises not indicating the air-fuel ratio imbalance responsive to detecting a degradation of one or more of the oxygen sensors.

While the method described above considers a threshold catalyst as a noise factor for AFR imbalance determinations, it should be appreciated that other noise sources may affect an AFR imbalance determination. For example, a degraded exhaust gas oxygen sensor may further affect the validity of an AFR imbalance detection. Thus, as described further herein with regard to FIG. 5, a method for degradation monitoring may include combining the output of multiple degradation monitors into a single degradation determination.

Figure 5:
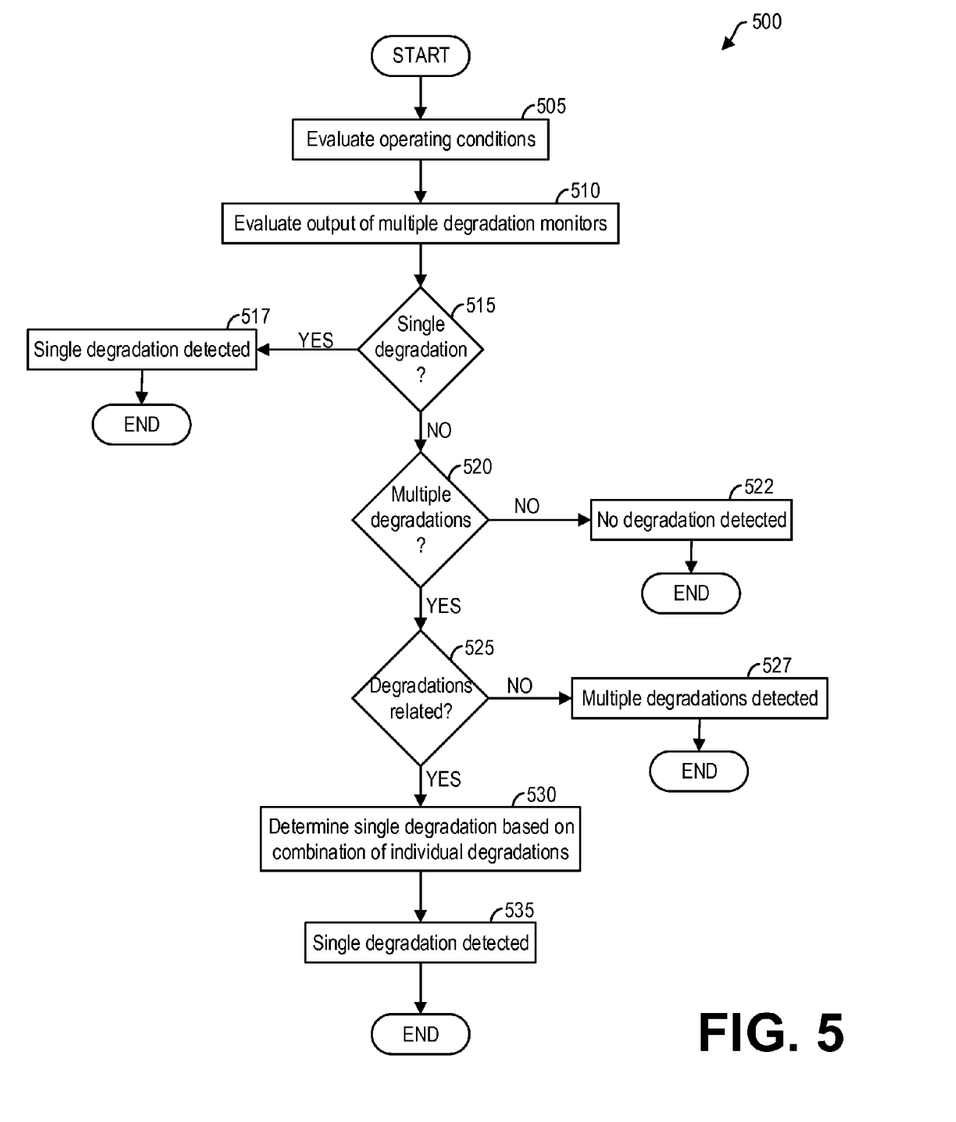
FIG. 5 shows a high-level flow chart illustrating an example method for multiple monitors.

FIG. 5 is a high-level flow chart illustrating an example method 500 for evaluating output of multiple degradation monitors in accordance with the current disclosure. In particular, method 500 relates to determining a single degradation based on output from a plurality of degradation monitors. Method 500 will be described herein with reference to the components and systems depicted in FIGS. 1 and 2, though it should be understood that the method may be applied to other systems without departing from the scope of this disclosure. Method 500 may be carried out by controller 12, and may be stored as executable instructions in non-transitory memory.

Method 500 begins at 505. At 505, method 500 evaluates engine operating conditions. Operating conditions may include, but are not limited to, engine temperature, ambient temperature, engine speed, engine load, time since engine stop, engine AFR, and HEGO sensor voltage. Method 500 proceeds to 510 after engine operating conditions are determined.

At 510, method 500 evaluates output of multiple degradation monitors. As non-limiting examples, the multiple degradation monitors may include a threshold catalyst monitor, an exhaust gas oxygen sensor degradation monitor, and an engine AFR imbalance monitor.

At 515, method 500 determines if a single degradation is detected based on the output of the multiple degradation monitors. If a single degradation is detected by an individual monitor ("YES"), then method 500 proceeds to 517. At 517, method 500 indicates that a single degradation is detected. In some examples, method 500 provides an indication of the single degradation by changing the operating state of a light or display panel. Method 500 then ends.

Returning to 515, if a single degradation is not detected ("NO"), method 500 proceeds to 520. At 520, method 500 determines if multiple degradations (e.g., more than one degradation) are detected. If multiple degradations are not detected ("NO"), method 500 proceeds to 522. At 522, method 500 indicates that no degradation is detected, since neither a single degradation nor multiple degradations are detected based on the output of multiple degradation monitors. Method 500 then ends.

If multiple degradations are detected ("YES"), method 500 proceeds to 525. At 525, method 500 determines if the multiple degradations are related or interdependent. The degradations may be interdependent if, for example, the evaluation of one component depends on the evaluation of another component. For example, if the catalyst or the exhaust gas oxygen sensors are degraded, then an AFR imbalance determination may be invalid since such a determination presumes the normal functioning of the catalyst and/or sensors. Similarly, if a threshold catalyst and a degraded exhaust gas sensor are detected, the threshold catalyst may be erroneously detected due to the degradation of the exhaust gas sensor. However, it is possible that multiple degradations detected may not be interdependent. For example, degradations occurring within an evaporative emissions control system may not directly influence degradation monitors in the exhaust system, and so the method may consider these degradations unrelated.

If the degradations are not related ("NO"), method 500 proceeds to 527. At 527, method 500 indicates that multiple degradations are detected. In some examples, method 500 provides an indication of the multiple degradations by changing the operating state of a light or display panel. Method 500 then ends.

If the degradations are related ("YES"), method 500 proceeds to 530. At 530, method 500 determines a single degradation based on the combination of individual degradations. For example, a look-up table or function may output a single degradation determination based on the combination of individual degradations. The look-up table or function may further determine the single degradation based on the particular degradation levels. As an illustrative example, the AFR imbalance monitor method described herein above with regard to FIG. 3 may detect an AFR imbalance but no threshold catalyst, and the catalyst gain estimate used to detect the AFR imbalance may be close to the AFR imbalance threshold. Meanwhile, a sensor monitor may detect a degraded exhaust gas oxygen sensor with a substantial degradation level. Method 500 may then determine a single degradation (e.g., degradation of the exhaust gas oxygen sensor) rather than two degradations (e.g., sensor degradation and AFR imbalance) based on the detected degradations and their respective degradation levels.

At 535, method 500 indicates a single degradation is detected, wherein the indicated single degradation comprises the single degradation determined at 530. In some examples, method 500 provides an indication of the single degradation by changing the operating state of a light or display panel. Method 500 may further adjust actuators to mitigate the single degradation. Method 500 then ends.

In this way, emissions can be reduced by avoiding actions to mitigate potentially invalid degradations, which may further increase emissions.

The technical effect of indicating a cylinder imbalance responsive to a catalyst transfer function determined only within a specified frequency range is that the cylinder imbalance will not be erroneously detected if the catalyst is degraded. Another technical effect is the adjustment of an actuator to mitigate a detected degradation. Yet another technical effect is the reduction of emissions.

As one embodiment, a method comprises, during feedback engine air-fuel ratio control responsive to output of an exhaust gas sensor positioned downstream of a catalyst, indicating a cylinder imbalance responsive to a catalyst transfer function determined only within a specified frequency range based on the exhaust gas sensor output, and adjusting an actuator in response to the indicated cylinder imbalance. In a first example of the method, indicating the cylinder imbalance is based on a gain of the catalyst transfer function above a threshold. A second example of the method optionally includes the first example and further comprises determining that the catalyst is nominal prior to indicating the cylinder imbalance. A third example of the method optionally includes one or more of the first and second examples, and further includes wherein the catalyst transfer function is based on a modeled output compared with the exhaust gas sensor output. A fourth example of the method optionally includes one or more of the first through third examples, and further includes wherein the specified frequency range is based on a predetermined catalyst square wave modulation frequency selected to optimize catalyst efficiency. A fifth example of the method optionally includes one or more of the first through fourth examples, and further includes wherein the feedback engine air-fuel control is an outer loop feedback control, the method further comprising during the outer loop feedback control, further performing inner loop feedback engine air-fuel ratio control responsive to an oxygen sensor located upstream of the catalyst, wherein the outer loop includes a superimposed square wave added to the feedback control. A sixth example of the method optionally includes one or more of the first through fifth examples, and further includes wherein the specified frequency range bounds a frequency of the superimposed square wave from above and below with an upper and lower frequency limit, respectfully, the lower frequency limit greater than zero. A seventh example of the method optionally includes one or more of the first through sixth examples, and further includes wherein during the feedback control the engine experiences transient and steady-state operating conditions while the catalyst transfer function is determined. An eighth example of the method optionally includes one or more of the first through seventh examples, and further includes wherein the catalyst is a three-way catalyst. A ninth example of the method optionally includes one or more of the first through eighth examples, and further includes wherein the air-fuel ratio control includes adjusting a fuel injection pulse width.

As another embodiment, a method comprises, responsive to detecting multiple degradations, indicating a single degradation based on the multiple degradations, and adjusting an actuator based on the single degradation. A first example of the method includes wherein the multiple degradations includes at least two of a cylinder imbalance, a threshold catalyst, a degraded fuel injector, and a degraded exhaust gas oxygen sensor. A second example of the method optionally includes the first example, and further comprises indicating at least two degradations of the multiple degradations if the at least two degradations are not interdependent. A third example of the method optionally includes one or more of the first and the second examples, wherein the single degradation indicated is determined by evaluating output of multiple degradation monitors detecting the multiple degradations. A fourth example of the method optionally includes one or more of the first through third examples, wherein evaluating the output of the multiple degradation monitors comprises comparing the output of the multiple degradation monitors and a type of each degradation detected.

In yet another embodiment, a system comprises an engine including multiple cylinders and an exhaust system, the exhaust system including a catalyst and oxygen sensors positioned upstream and downstream of the catalyst, and a controller including instructions stored in non-transitory memory that when executed cause the controller to: calculate a gain of a catalyst transfer function based on data output by the oxygen sensors; responsive to a catalyst monitor indicating the catalyst is not at a threshold level, indicating a cylinder imbalance responsive to the gain above a threshold; and adjust an actuator in response to the cylinder imbalance. In a first example of the system, the gain of the catalyst transfer function is calculated only within a specified frequency range of a predetermined forcing function plus and minus an offset. A second example of the system optionally includes the first example, wherein the specified frequency range of the predetermined forcing function is based on a predetermined catalyst square wave modulation frequency selected to optimize catalyst efficiency. A third example of the system optionally includes one or more of the first and second examples, wherein the offset is adjustable within a predetermined range surrounding the predetermined catalyst square wave modulation frequency. A fourth example of the system optionally includes one or more of the first through third examples, wherein the engine further includes multiple fuel injectors, and wherein adjusting the actuator in response to the cylinder imbalance comprises adjusting a fuel pulse width of at least one of the multiple fuel injectors.

As another embodiment, a method comprises: perturbing a catalyst via supplying the catalyst exhaust gases resulting from a varying air-fuel ratio; routing data from an upstream oxygen sensor through a model to provide a model output derivative estimate and data from a downstream oxygen sensor through a high-pass filter to provide a tailpipe air-fuel ratio derivative estimate; band-pass filtering the model output to provide a band-passed model output derivative estimate and band-pass filtering the tailpipe air-fuel ratio derivative estimate to provide a band-passed tailpipe air-fuel ratio derivative estimate; estimating a catalyst transfer function gain magnitude from a difference between the band-passed tailpipe air-fuel ratio derivative estimate and the band-passed model output derivative estimate; and indicating an air-fuel ratio imbalance responsive to the catalyst transfer function gain magnitude above a threshold. In a first example of the method, the method further comprises low-pass filtering the band-passed model output derivative estimate and the band-passed tailpipe air-fuel ratio derivative estimate before estimating the catalyst transfer function gain magnitude. In a second example of the method optionally including the first example, the method further comprises determining an error between the low-pass filtered band-passed model output derivative estimate and the low-pass filtered band-passed tailpipe air-fuel ratio derivative estimate. In a third example of the method optionally including one or more of the first and second examples, the method further comprises not indicating the air-fuel ratio imbalance responsive to detecting a degradation of the catalyst based on an amount of oxygen stored in the catalyst. In a fourth example of the method optionally including one or more of the first through third examples, the method further comprises not indicating the air-fuel ratio imbalance responsive to detecting a degradation of one or more of the oxygen sensors.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    during feedback engine air-fuel ratio control responsive to output of an exhaust gas sensor positioned downstream of a catalyst, indicating a cylinder imbalance responsive to a gain magnitude of a catalyst transfer function above a threshold, the catalyst transfer function determined only within a specified frequency range based on the exhaust gas sensor output; and
    adjusting an injection pulse width of at least one fuel injector responsive to the indicated cylinder imbalance.

2. The method of claim 1, further comprising determining that the catalyst is nominal prior to indicating the cylinder imbalance.

3. The method of claim 1, wherein the catalyst transfer function is based on a comparison of a derivative of modeled output of the exhaust gas sensor with a derivative of the exhaust gas sensor output, the modeled output of the exhaust gas sensor based on output of another exhaust gas sensor which is positioned upstream of the catalyst.

4. The method of claim 1, wherein the specified frequency range is based on a predetermined catalyst square wave modulation frequency selected to optimize catalyst efficiency.

5. The method of claim 1, wherein the feedback engine air-fuel control is an outer loop feedback control, the method further comprising during the outer loop feedback control, further performing inner loop feedback engine air-fuel ratio control responsive to an oxygen sensor located upstream of the catalyst, wherein an outer loop includes a superimposed square wave added to the feedback control.

6. The method of claim 5, wherein the specified frequency range bounds a frequency of the superimposed square wave from above and below with an upper and lower frequency limit, respectively, the lower frequency limit greater than zero.

7. The method of claim 5, wherein during the feedback control the engine experiences transient and steady-state operating conditions while the catalyst transfer function is determined.

8. The method of claim 1, wherein the catalyst is a three-way catalyst.

9. The method of claim 1, wherein the air-fuel ratio control includes adjusting the injection pulse width of at least one fuel injector.

10. A method, comprising:
    varying an air-fuel ratio of an engine by adjusting a fuel pulse width of at least one fuel injector of the engine;
    perturbing a catalyst via supplying catalyst exhaust gases from the engine while varying the air-fuel ratio;
    routing data from an oxygen sensor upstream of the catalyst through a model to provide a first estimate of a derivative of an air-fuel ratio downstream of the catalyst and data from an oxygen sensor downstream of the catalyst through a high-pass filter to provide a second estimate of the derivative of the air-fuel ratio downstream of the catalyst;
    band-pass filtering the first estimate to provide a band-passed first estimate and band-pass filtering the second estimate to provide a band-passed second estimate;
    estimating a catalyst transfer function gain magnitude from a difference between the band-passed second estimate and the band-passed first estimate;
    indicating an air-fuel ratio imbalance responsive to the catalyst transfer function gain magnitude above a threshold; and
    adjusting the fuel pulse width of at least one fuel injector of the engine in response to the indicated air-fuel ratio imbalance.

11. The method of claim 10, further comprising low-pass filtering the band-passed first estimate and the band-passed second estimate before estimating the catalyst transfer function gain magnitude.

12. The method of claim 11, further comprising determining an error between the low-pass filtered band-passed first estimate and the low-pass filtered band-passed second estimate.

13. The method of claim 10, further comprising not indicating the air-fuel ratio imbalance responsive to detecting a degradation of the catalyst based on an amount of oxygen stored in the catalyst.

14. The method of claim 10, further comprising not indicating the air-fuel ratio imbalance responsive to detecting a degradation of one or more of the oxygen sensors.

15. A system, comprising:
an engine including multiple cylinders and an exhaust system, the exhaust system including a catalyst and oxygen sensors positioned upstream and downstream of the catalyst; and
a controller including instructions stored in non-transitory memory that when executed cause the controller to:
calculate a gain of a catalyst transfer function based on data output by the oxygen sensors;
responsive to a catalyst monitor indicating the catalyst is not at a threshold level, indicate a cylinder imbalance responsive to the gain above a threshold; and
adjust an actuator in response to the cylinder imbalance.

16. The system of claim 15, wherein the gain of the catalyst transfer function is calculated only within a specified frequency range of a predetermined forcing function plus and minus an offset.

17. The system of claim 16, wherein the specified frequency range of the predetermined forcing function is based on a predetermined catalyst square wave modulation frequency selected to optimize catalyst efficiency.

18. The system of claim 17, wherein the offset is adjustable within a predetermined range surrounding the predetermined catalyst square wave modulation frequency.

19. The system of claim 15, wherein the engine further includes multiple fuel injectors, and wherein adjusting the actuator in response to the cylinder imbalance comprises adjusting a fuel pulse width of at least one of the multiple fuel injectors.

* * * * *